(No Model.)

D. McCAUSLAND.
THILL JACK.

No. 442,040. Patented Dec. 2, 1890.

Witnesses
Gertrude H. Anderson
Charles L. Coffin

Inventor
David McCausland
By Attorney
Geo. H. Lothrop

UNITED STATES PATENT OFFICE.

DAVID McCAUSLAND, OF DETROIT, MICHIGAN, ASSIGNOR OF ONE-HALF TO WILLIAM P. LANE, OF SAME PLACE.

THILL-JACK.

SPECIFICATION forming part of Letters Patent No. 442,040, dated December 2, 1890.

Application filed September 8, 1890. Serial No. 364,386. (No model.)

*To all whom it may concern:*

Be it known that I, DAVID MCCAUSLAND, of Detroit, in the county of Wayne and State of Michigan, have invented a new and useful Improvement in Thill-Jacks, of which the following is a specification.

My invention consists in an improvement in thill-jacks, hereinafter fully described and claimed.

Figure 1:
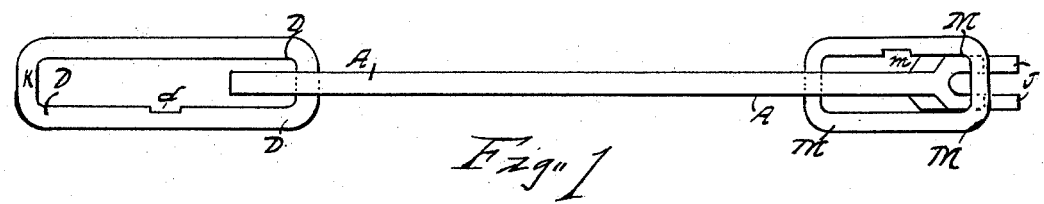
Figure 2:
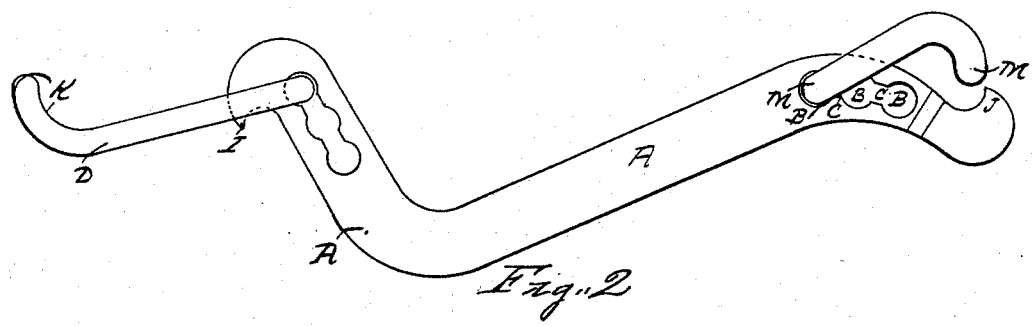
Figure 3:
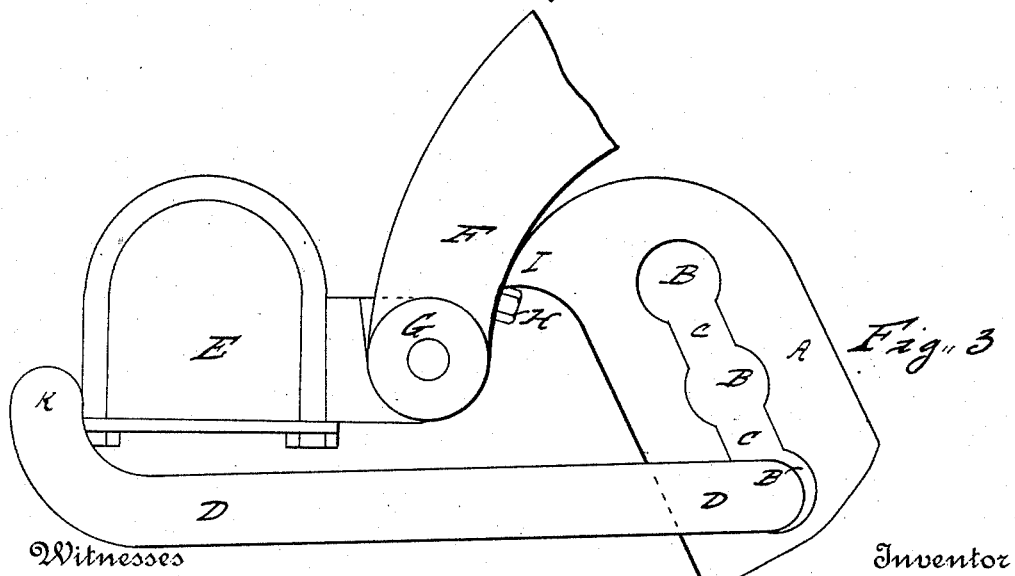

Figure 1 is a plan view. Fig. 2 is a side of the complete device, and Fig. 3 is a perspective of the jack in position for use with the lever partly broken away.

The jack consists of a bent lever A, of any suitable material, such as malleable iron wrought-iron, or steel, terminating at one end in a hook I, for use on thills, and at the other end in a forked or bifurcated hook J, intended for use with a pole.

D represents a bent link, whose end K is turned up to engage with the axle of a vehicle and is connected with one end of the lever A by passing through a hole B in said lever. For the purpose of making the link adjustable to give different degrees of leverage I form several holes B in the lever A, as clearly shown in Fig. 3, and the link D may be adjusted in any one of these. To prevent the annoyance of having the link slip from one hole B to another when in use, I make the connecting-slots C between the holes B of less width than the diameter of the iron of which the link D is formed, and make a groove $d$ at any convenient point in the link, (as illustrated in Fig. 1 on the side of the link,) so that to adjust the link from one hole B to the other it is turned until the slot $d$ registers with the slot C, in which position the link may be passed from one hole B to the other. At the other end of the lever A is a link M exactly like link D, only it may usually be somewhat shorter, as the distance from the back of the axle to the front of the pole-iron is usually somewhat less than is the corresponding distance when thills are used. The link M is adjustable in exactly the same way that the link D is adjusted.

The operation of my invention is as follows: Let E represent the axle of a buggy with the ordinary clip for attaching the thill, and F G represent the end of an ordinary thill-coupling, by which the thill is connected with the clip. A rubber or other suitable spring being placed in the clip, the thill-coupling F G is put in proper position, the end K of link D hooked over the clip back of the axle, and the hook I brought against the shaft-coupling F G, (preferably just above one of the nuts H, by which the thill is attached to the coupling,) when by raising the free end of the lever A the thill-coupling is forced into the clip, compressing the spring behind it until the screw-bolt can be easily passed through the eyes of the clip and coupling. With a pole-iron the operation is the same, the forked end J being used instead of the end I.

What I claim as my invention, and desire to secure by Letters Patent, is—

1. A thill-jack consisting of a lever having an upwardly-bent hooked end provided with a series of holes B, connected by contracted slots C, and a link D, having one end passed through a hole and adapted to move from hole to hole through the contracted slots, substantially as described.

2. A thill-jack consisting of a lever A, having at one end a bifurcated hook J and a link M, and at the opposite end bent upwardly and provided with a hook I and link D, substantially as described.

3. A thill-jack having at each end a hook and a series of holes B, connected by contracted slots C, and links D and M, having their end portions passed, respectively, through a hole at each end of the lever and movable from hole to hole through the contracted slots, substantially as described.

DAVID McCAUSLAND.

Witnesses:
CHAS. C. KELLOGG,
MAGGIE MCCAUSLAND.